SYSTEM AND APPARATUS FOR VARIABLE PHASE MICROSCOPY

Filed Aug. 13, 1962 5 Sheets-Sheet 1

HAROLD OSTERBERG
*INVENTOR.*

*BY*
BLAIR, SPENCER & BUCKLES
ATTORNEYS.

HAROLD OSTERBERG
*INVENTOR.*

*BY*
BLAIR, SPENCER & BUCKLES

ATTORNEYS.

SYSTEM AND APPARATUS FOR VARIABLE PHASE MICROSCOPY

Filed Aug. 13, 1962

HAROLD OSTERBERG
*INVENTOR.*

*BY*
BLAIR, SPENCER & BUCKLES

ATTORNEYS.

April 27, 1965 H. OSTERBERG 3,180,216

SYSTEM AND APPARATUS FOR VARIABLE PHASE MICROSCOPY

Filed Aug. 13, 1962 5 Sheets-Sheet 4

HAROLD OSTERBERG
*INVENTOR.*

*BY*
BLAIR, SPENCER & BUCKLES

ATTORNEYS.

SYSTEM AND APPARATUS FOR VARIABLE PHASE MICROSCOPY

Filed Aug. 13, 1962 5 Sheets-Sheet 5

INVENTOR.
HAROLD OSTERBERG
BY
Blair and Buckles
ATTORNEYS.

United States Patent Office 3,180,216
Patented Apr. 27, 1965

3,180,216

SYSTEM AND APPARATUS FOR VARIABLE PHASE MICROSCOPY

Harold Osterberg, Sturbridge, Mass., assignor to American Optical Company, Southbridge, Mass., a voluntary association of Massachusetts Filed Aug. 13, 1962, Ser. No. 221,647
7 Claims. (Cl. 88—39)

This invention relates to improved apparatus for variable phase microscopy, and particularly to such apparatus employing a plurality of light beams for illuminating a specimen.

This application is a continuation-in-part of my earlier application Serial No. 771,539 filed November 3, 1958, now abandoned.

Conventional microscopes have their primary usefulness in the examination of opaque or translucent specimens which show visible differences in color, opacity or light absorption between different portions of the specimen or between a specimen particle and its surround. A specimen area or particle which fails to show such differences because it has substantially the same color or light absorption characteristics as its surround is difficult or impossible to observe with a conventional microscope. Particularly when the optical path difference between a particle and its surround is less than one-twentieth of a wave-length of the illuminating light, new microscopy techniques are required to make such a particle visible to the observer.

Polarizing microscopes, employing polarized light for illuminating the specimen, and interference microscopes, employing birefringent elements to act upon the light as it is focused upon the specimen, may both be useful if the specimen has certain optical characteristics, but some internal, structural and surface details may be invisible with such instruments. Furthermore, conventional interference microscopes employ non-homogeneous anisotropic or birefringent materials in their light focusing portions, between the substage condenser and the image plane, and these materials adversely affect the focus of the images formed therein.

So-called "phase" microscopes, designed to produce visible contrast between portions of the image of slightly different phase retardation, have been found to make possible the visual observation of such specimen particles which are invisible or only partially observable in other types of microscopes.

These phase microscopes were developed to utilize the very small phase differences in the light transmitted by various portions of the specimen observed. By modifying with the aid of a "phase plate" the interference phenomena that take place between the light diffracted or "deviated" by a specimen particle and "undeviated" light unaffected by its passage through the particle, these instruments have succeeded to a considerable extent in making possible visual observation of such particles.

Phase microscopes, however, are limited in the number of different phase adjustments which they can provide, since they rely upon so-called "phase" plates or "diffraction" plates having different areas coated with materials having different optical properties, and each instrument can be equipped with only a limited number of such phase plates.

For this reason, "variable" phase microscopes of various kinds have been proposed from time to time. Some of these have incorporated complex optical wedge systems for achieving varying amounts of phase retardation of the light passing through certain parts of the field, such as Bennett Patent No. 2,675,737, Osterberg Patent No. 2,732,759, and Bennett Patent No. 2,737,084.

The present inventor has also proposed the "Polanret" system of variable phase microscopy, employing various polarizing and birefringent elements in the light focusing portion of a microscope system. Volume 37 Journal of the Optical Society of America, 726 (1947).

These variable phase systems all permit some measure of variation in the adjustments which can be made to produce visible contrast in images of otherwise unobservable particles and specimens. All of such systems, however, include non-homogeneous anisotropic or birefringent elements in the resolution section of the instrument, adversely affecting the focusing of the system and producing unavoidable blurring of the image. Since the individual light rays converging toward a focal point travel at different angles through these birefringent elements, unavoidable non-uniform phase retardations are introduced causing blurring of focused images. Even expensive optical elements of high quality cannot entirely overcome the adverse effects of such birefringent elements included in the focusing portion of the system. Furthermore, these systems fail to achieve the maximum possible phase contrast and flexibility of adjustment, and they generally produce undesirable "halo" effects at the boundaries of contrasting areas of the image, adversely affecting the definition available with these systems.

The present invention, however, operates on unique and novel principles. It employs a plurality of spacially separated light beams to illuminate the specimen, preferably by critical illumination. The polarization, amplitude and phase of the illuminating beams are separately controlled in the substage of the phase microscope according to the preferred embodiment of the present invention. The relative phase of the separate illuminating beams are controlled in some embodiments of the invention by birefringent elements interposed in the beams in the substage of the phase microscope. In this case the beams are preferably collimated so that each beam passes through the birefringent elements at substantially the same angle.

The beams may be formed by locating an illuminated pin-hole or small iris at the focal point of a lens. The lens collimates the light illuminating the pin-hole or iris into parallel rays comprising substantially coherent plane wave fronts. An opaque disk is then located in the path of the collimated light. The opaque disk has a plurality of apertures in it for producing the spacially separated illuminating beams. A laser or other coherent light source may also be used to provide the coherent illumination.

When coherent illumination is used, light from each of the illuminating beams is capable of interference with light from any of the other illuminating beams. In the preferred embodiment of the invention, simultaneous interference effects between the undeviated portions of these coherent beams and the portions of each beam deviated by the specimen are employed to create visible contrast in the image of the specimen.

In addition to superior focusing characteristics, this invention achieves improved definition, contrast and flexibility of contrast adjustment, giving a broad range of selectable contrast variations, as more fully described below.

Accordingly, a principal object of the present invention is to provide apparatus suitable for phase microscopy providing a high degree of variability in the adjustable phase differences which may be produced. A further object of the invention is to provide apparatus of the above character having a high degree of variability in the adjustable intensity differences which may be produced. Another object of the invention is to provide apparatus of the above character adapted to achieve the foregoing objects simultaneously. A further object of the invention is to provide apparatus of the above character adapted to reduce halo effects in the images of specimens, thus providing improved definition. A further object of the invention is to provide apparatus of the above character incorporating means operable with either "critical" illumination or "Kohler" illumination to provide a wide range of variations in contrast. An additional object of the invention is to provide apparatus of the above character affording the advantages of a selectable plurality of phase plates together with all variations therebetween. Another object of the invention is to provide apparatus of the above character utilizing combinations of interference phenomena between different light beams to produce greater and more variable image contrast then heretobefore possible. Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 13:
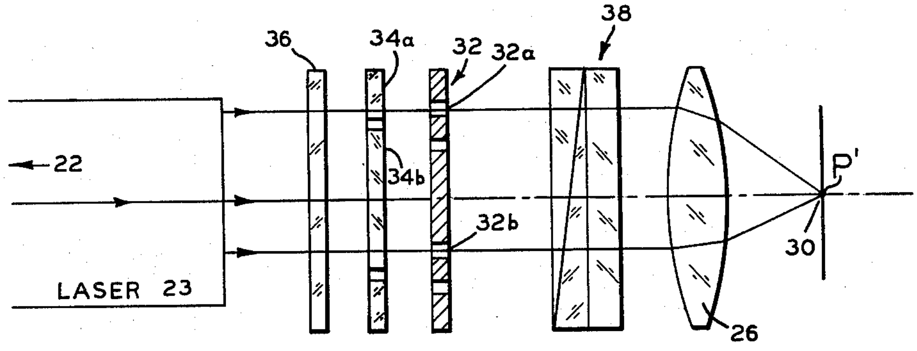
Figure 14:
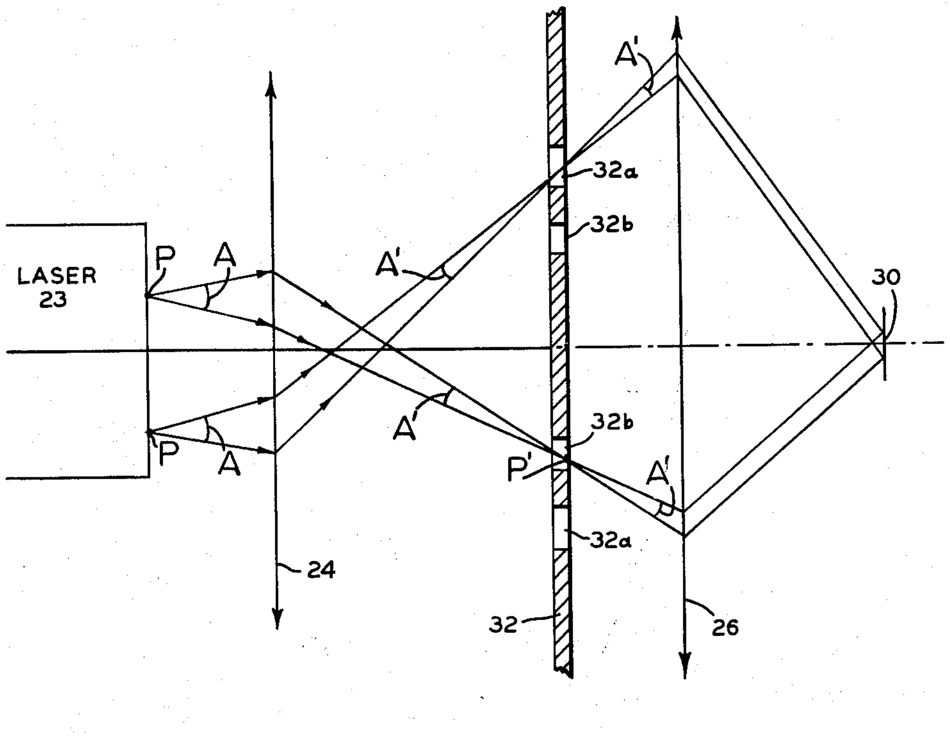

FIGURES 11 and 12 comprise phase vector diagrams illustrating the operation of the invention;

FIGURE 13 is a fragmentary schematic diagram of a laser illuminated optical system incorporating the present invention; and FIGURE 14 is a fragmentary schematic diagram illustrating a modification of the system of FIGURE 13.

In the variable phase microscopes of the present invention, means such as a condenser diaphragm incorporating a plurality of apertures provides illumination of the specimen by a plurality of undeviated beams of light from a single light source. A corresponding plurality of polarizing elements plane polarize these undeviated beams in different polarization planes, and a uniform polarizer placed across these beams permits variations in their relative intensities. An analyzer placed near the image plane of the system similarly permits variations in the relative intensity of each undeviated beam and its deviated rays with respect to the other beams.

So-called "Kohler" illumination of the specimen by substantially parallel rays of illumination having a substantially plane wave front has heretofore been considered preferable in phase microscopy, and so-called "critical" illumination with converging rays focused upon the specimen has been considered undesirable. In the preferred arrangements of this invention utilizing a coherent light source, however, the illumination system is preferably adjusted to provide critical illumination of the specimen, and the cooperative action of the different elements of the invention thereby achieves several important advantages. In addition to greatly increased flexibility of adjustment of phase and amplitude variations, the use of critical illumination permits variable birefrigent elements to be placed in the illuminating beams at points where the rays are following substantially parallel paths, whereby adverse effects upon focusing and image formation can be minimized.

A fixed phase plate or diffraction plate is preferably also incorporated in the variable phase microscopy systems of the present invention in the resolution section of the instrument. Such a phase plate has conjugate areas through which the undeviated beams are directed, and complementary areas through which the major portion of the deviated rays pass. If these different areas are etched, stained or coated to give them different phase retardation or absorption characteristics, the phase retardations and intensities of the deviated and undeviated beams may be given fixed relative differences, and the variable differences introduced by the other elements of the present invention will cooperate therewith to produce great flexibility of contrast selection and variation.

Figure 1:
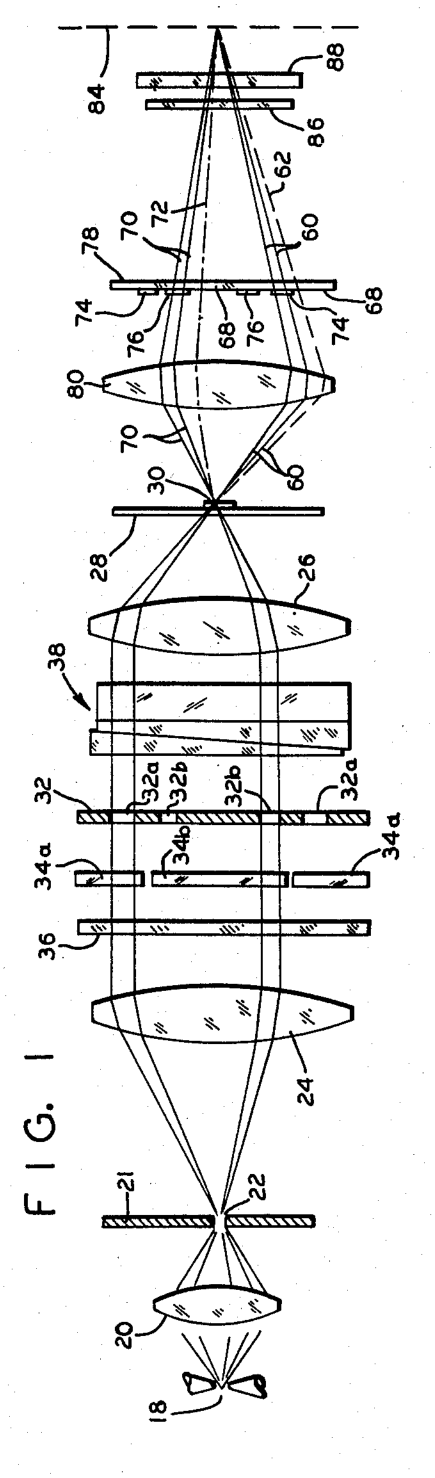
FIGURE 1 is a schematic diagram of the optical system of a variable phase microscope incorporating one embodiment of the invention and employing so-called "critical" illumination.
Figures 3, 4, 5:
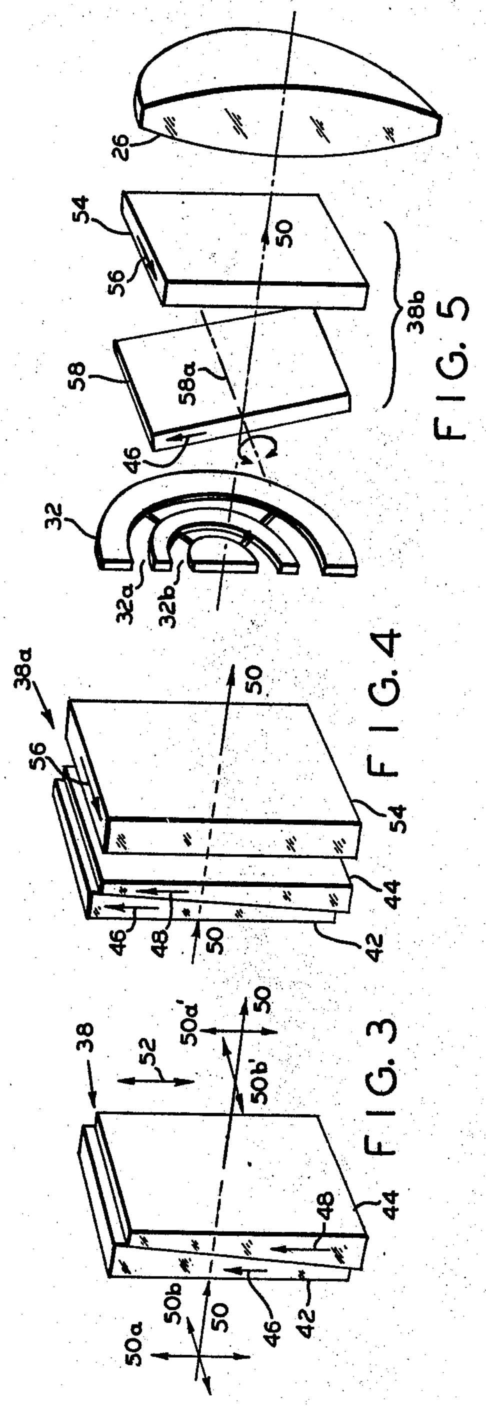
FIGURE 3 is a perspective schematic sectional view of the optical elements of a Babinet-Soliel compensator which may be employed in the present invenion.
FIGURE 4 is a perspective schematic view of a modified Babinet-Soliel compensator including a fixed wave plate which is preferably incorporated in the systems shown in FIGURES 1 and 2.
FIGURE 5 is a perspective schematic view of a modified Berek compensator including a fixed wave plate which may be incorporated in the systems of the present invention.

The preferred embodiment of the invention is shown schematically in FIGURE 1, in which critical illumination is shown, the rays of light thereof converging to a focus at the specimen 30 located in the object plane of the system. A relatively small "secondary" light source 22 is preferably employed, and this secondary source may be obtained, for example, by the use of an iris diaphragm 21 positioned in front of a zirconium arc 18 and a condenser lens 20 axially aligned with the microscope system and focused so that the arc 18 is imaged upon the plane of the diaphragm 21. Thus, light source 22, together with a collimator, such as lens 24 and a condenser, such as lens 26, comprise an illumination means adapted and adjusted to provide coherent illumination between lenses 24 and 26 and critical illumination at the object 30, which is mounted on slide 28. When used herein the term "critical illumination" means focusing the light source upon the specimen itself. The rays of light passing between collimator 24 and condenser 26 are substantially parallel, and an opaque condenser diaphragm 32 is located between collimator 24 and condenser 26. Diaphragm 32 is provided with a plurality of apertures, which preferably take the form of concentric annuli 32*a* and 32*b*, as shown in FIGURE 5, giving the advantages of axial symmetry. Diaphragm 32 thus blocks all light coming from source 22 except the beams or bundles of rays passing through apertures 32*a* and 32*b*. From each "point source" in aperture 22, the collimated rays passing through apertures 32*a* and 32*b* will be capable of interfering with one another since the apertures 32*a* and 32*b* will be illuminated with light that is substantially coherent over the entire area of diaphragm 32. That is, all points of diaphragm 32 and in particular apertures 32*a* and 32*b* will be illuminated coherently, i.e., with a definite phase relationship. The same effect could be achieved by illuminating diaphragm 32 with light from a laser.

A first zonal polarizer 34*a* and a second zonal polarizer 34*b* are positioned to intercept and polarize the beams of light passing through apertures 32*a* and 32*b* respectively. In the embodiment shown in FIGURE 1, zonal polarizer 34*b* may be a disc of transparent polarizing material having a diameter greater than the outer diameter of annular aperture $32b$ and less than the inner diameter of annular aperture $32a$, while zonal polarizer $34a$ may be a concentric annular plate of similar material having an inner diameter less than the inner diameter of aperture $32a$ and greater than the outer diameter of aperture $32b$. These zonal polarizers are oriented to polarize in different planes the light passing through the apertures. A rotatable uniform or unitary polarizer 36 of similar material is interposed across the paths of the light beams, and rotational adjustment of this uniform polarizer varies the amplitude of each light beam. If the two beams are polarized in perpendicular planes, by zonal polarizers $34a$ and $34b$, the intensity of each beam can be brought to a maximum when the other beam is blocked by adjustment of the uniform polarizer 36.

Also positioned between collimating lens 24 and condenser lens 26 is a phase retarding means 38 adapted to produce a relative phase retardation between the separate coherent beams. If the two beams are normally plane polarized as described above, their planes of polarization may be aligned with the principal axes of a modified Babinet-Soliel compensator $38a$ as shown in FIGURE 4, or of a modified Berek compensator $38b$, as shown in FIGURE 5, or of a single fixed wave plate of birefringent material, such as a mica sheet. A separate fixed or variable phase retarding means can be interposed in the path of one or more of said beams, just as the zonal polarizers $34a$ and $34b$ intercept separate beams, but the three compensators mentioned above may be placed across all of the beams without requiring precise lateral adjustment. Furthermore, the Babinet and Berek compensators permit pre-selected variations to be made in the relative phase retardation between the two beams.

In the Babinet-Soliel compensator, as shown in FIGURE 3, two oppositely wedge shaped plates 42 and 44 of birefringent material such as calcite, mica or quartz, are so adjacently placed that their non-adjacent surfaces are parallel, and the fast axes of the two plates are also parallel, as indicated by arrows 46 and 48. The two plates thus comprise a wave plate of variable thickness. If two coherent beams of light polarized in perpendicular planes 50 and $50b$ are passed through plates 42 and 44 in the direction of arrows 50, and if polarization plane $50a$ is parallel to fast axes 46 and 48, the birefringent plates will transmit beam $50a$ slightly faster than beam $50b$, introducing a relative phase retardation between the two beams, as indicated by double arrows $50a'$ and $50b'$. The amount of this relative phase retardation will be proportional to the combined thickness of plates 42 and 44, and by adjustment of one plate in the direction indicated by double arrow 52, this combined thickness may be varied to change the relative phase retardation between the two beams.

As mentioned above, a single fixed phase retarding means may be employed. Thus, for example, in FIGURE 5, tiltable plate 58 may be omitted, and fixed plate 54 may be made of birefringent material, such as mica, with its fast axis oriented parallel to the polarization plane of one of the beams, thereby providing a fixed relative phase retardation between the separate coherent normally polarized beams.

If a fixed wave plate 54 is combined with plates 42 and 44, as shown in FIGURE 4, the fast axis 56 of plate 54 being normal to fast axes 46 and 48, the relative retardation introduced by fixed wave plate 54 may be partly or totally counteracted by plates 42 and 44. Adjustment in either direction from a preselected value of relative phase retardation is thereby made possible. Thus, if the combined thickness of plates 42 and 44 at a central point in the adjustment range substantially corresponds to the thickness of fixed plate 54, no relative retardation is produced. Adjustment in either direction than produces a corresponding relative phase retardation or advance of the preselected amount desired.

Figure 6:
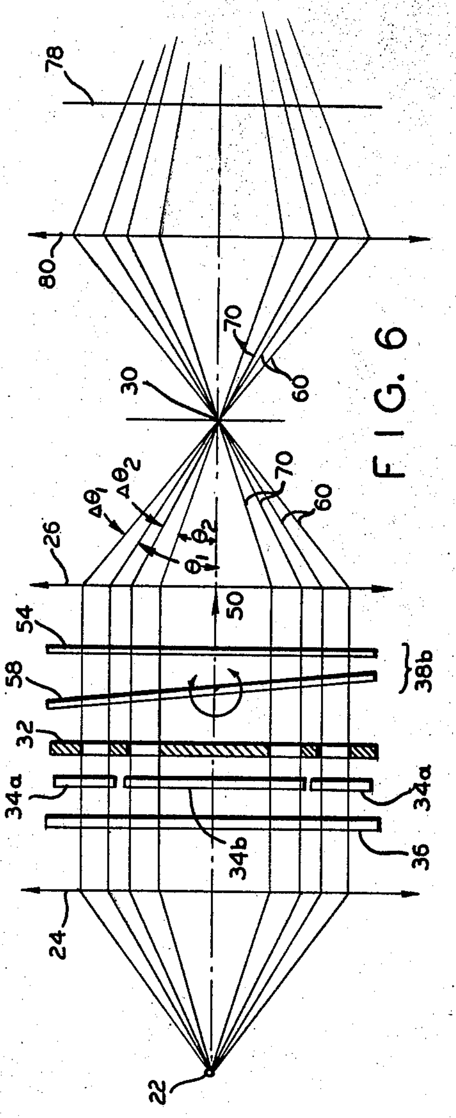
FIGURE 6 is a diagram of the light beams passing through the optical system shown in FIGURE 1.

A less expensive phase retarding means suitable for use in the systems of the present invention is the tiltable plate or Berek compensator $38b$, shown schematically in FIGURES 5 and 6. Here a single birefringent plate 58 is adjustably rotatable about axis $58a$. Here, minimum relative phase retardation is produced when plate 58 is adjusted normal to direction 50 along which light travels through the apparatus. The effective thickness of plate 58 may be increased by tilting the plate, causing the light to follow an oblique and longer path through plate 58. Fixed plate 54, with its fast axis 56 substantially normal to fast axis 46 of plate 58, again counteracts the relative retardation produced by plate 58, permitting adjustment from a predetermined value of relative phase retardation.

The two coherent and normally polarized beams passing from annular apertures $32a$ and $32b$ along substantially parallel paths toward condenser 26 may thus have their relative amplitudes and their relative phase flexibly adjusted over wide ranges of values. By placing phase retarding means 38 in a position where these beams are substantially parallel, as shown in FIGURES 1 and 6, the deleterious effects of birefringent elements upon the focusing and imaging of these beams may be minimized or eliminated.

Figure 7:
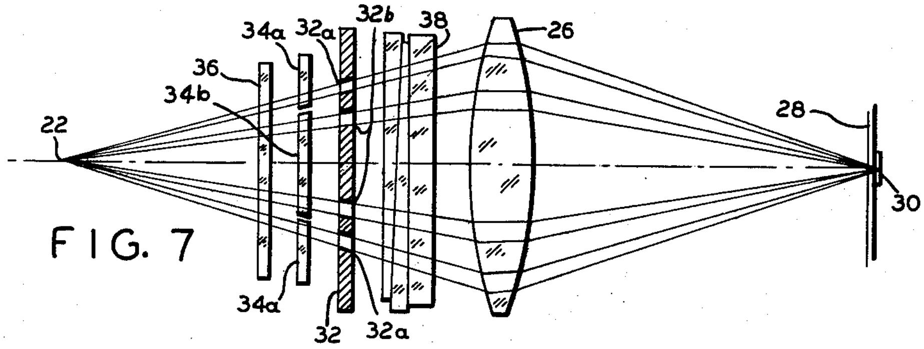
FIGURE 7 is a schematic diagram of a portion of the optical system of a variable phase microscope incorporating a modification of the embodiment of the invention shown in FIGURE 1.

It is not essential, however, that the phase retarding means 38 be placed in a position where the separate beams are parallel, and good results may also be obtained with a simpler system, such as that shown in FIGURE 7, in which the separate coherent beams travel divergently along non-parallel paths from source 22 through the polarizers $34a$, $34b$ and 36 and the phase retarding means 38 to a condenser, such as lens 26, which focuses them as critical illumination upon object 30.

The optical elements arranged as described above thus produce two separate beams of coherent light providing critical illumination of the specimen 30. The portions of these beams which pass unaffected through the surround and the specimen particles are the undeviated rays, e.g. rays 60 and 70 respectively, and these rays are focused by objective 80 upon image plane 84. The portions of the original beams which are diffracted by the specimen particles are the deviated rays, e.g. rays 62 and 72 in FIGURE 1. Undeviated rays 60 and 70 pass through conjugate areas 74 and 76 respectively of phase plate 78, (i.e. the images of aperatures $32a$ and $32b$ respectively). The deviated rays diffracted by the specimen particles will pass through all parts of phase plate 78. The sizes of the apertures $32a$ and $32b$ are chosen so that conjugate areas 74 and 76 occupy only a small part, preferably substantially less than one-half, of the total area of phase plate 78. For practical purposes, therefore, the deviated rays may be regarded as passing through the complementary areas 68. Accordingly, phase and amplitude differences between the undeviated rays and the deviated rays may be introduced, using the conventional techniques of phase microscope design, by etching, staining or coating the different areas of phase plate 78 to produce the desired differences in absorption and phase retardation characteristics between the different areas.

As shown in FIGURE 1, a rotatable analyzer 88, preferably of transparent polarizing material, and a rotatable quarter-wave plate 86 of birefringent material are positioned between phase plate 78 and image plane 84, and these elements are adjustable to produce optimum contrast in the observed image. The fast axis of quarter-wave plate 86 should normally be oriented at 45° to the two perpendicular polarization planes of undeviated beams 60 and 70, although it may be rotated to other azimuths for purposes of further adjustment.

The elements 86 and 88 thus form a phase compensator which is combined with the other elements of the invention to increase the flexibility and enhance the contrasts produced by the system. Thus, for example, analyzer 88 may be rotated to a position where it will substantially block one of the undeviated beams such as beam 60, allowing only undeviated beam 70 and its deviated beam to reach image plane 84.

The undeviated rays 60 and 70 and the deviated rays 62 and 72 are focused at image plane 84 by objective lens 80, and since the illumination is coherent, interference effects between all of the different rays may be employed to introduce and enhance apparent contrasts in the various portions of the image of the specimen, permitting observation of the structural and boundary details which could not otherwise be seen. By employing two coherent beams of critical illumination, greater contrast control is made possible, and the halos observed with conventional phase microscopes can be minimized. Furthermore, specimen particles which differ slightly from their surround only in absorption but not in phase retardation characteristics may now be observed, as can particles which differ slightly from the surround only in retardation but not in absorption characteristics. Monochromatic light is preferred with the present invention to produce the most precise predetermined phase retardations and resulting maximum contrast effects, but polychromatic or white light may also be used with good results.

Figure 8:
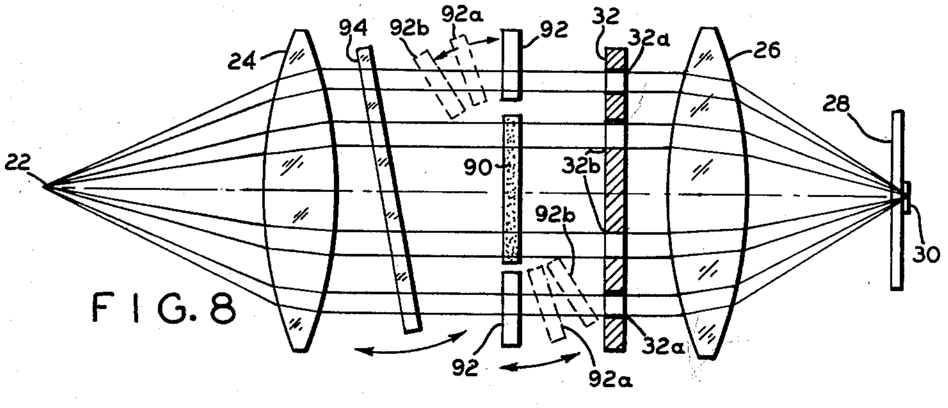
FIGURE 8 is a schematic diagram of a portion of the optical system of a variable phase microscope embodying a different embodiment of the present invention.
Figure 9:
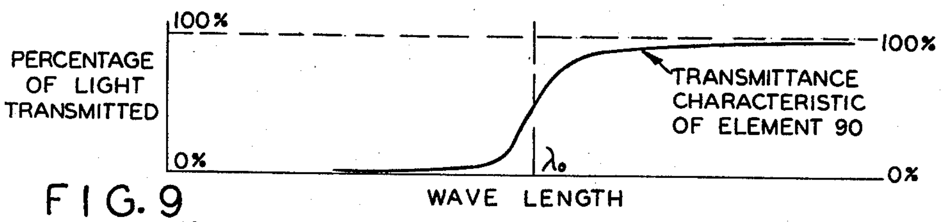
FIGURE 9 is a graph of the transmittance characteristic curve of element 90 shown in FIGURE 8, plotted against wavelength of light employed.
Figure 10:
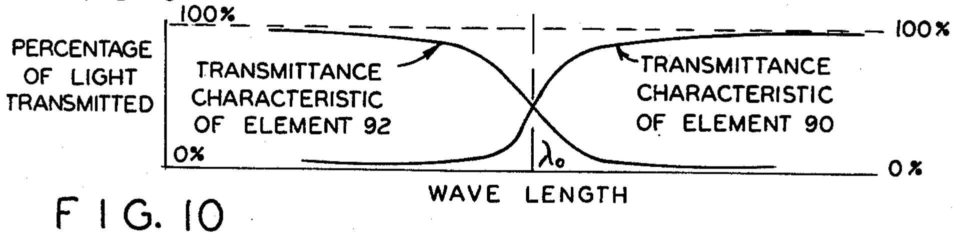
FIGURE 10 is a graph of the transmittance characteristic curves of elements 90 and 92 in a modified form of the embodiment shown in FIGURE 8, plotted against wavelength of light employed.

A different embodiment of the present invention is shown in FIGURES 8, 9 and 10, in which variations in the relative amplitude and phase of the coherent light beams passing through the two apertures 32*a* and 32*b* are produced without the use of polarizing elements. In this embodiment, the element 94 is a tiltable, multilayer narrow band-pass interference filter designed to transmit a particular wavelength of normally incident light. As this filter is tilted, the wavelength transmitted varies from this particular wavelength.

In one form of this embodiment, element 92 is a clear transparent plate of glass or the like which is positioned to intercept the beam passing through aperture 32*a*, and is tiltable to alter the optical path length of that beam. Element 90 is a fixed absorbing plate whose optical path equals that of element 92 in one of its adjusted positions, such as the position 92*a* shown in FIGURE 8. Absorbing plate 90 should possess a fairly sharp "transmission edge," as illustrated in the graph of FIGURE 9, so that it will substantially block light wavelengths less than a certain central wavelength $\lambda_0$ in the visible spectrum, and transmit wavelengths greater than $\lambda_0$. As the interference filter 94 is tiltably adjusted, the transmitted wavelength will vary around $\lambda_0$, thus altering the amplitude of the beam passing through aperture 32*b* transmitted by absorbing plate 90. The adjustment of interference filter 94 thus varies the relative amplitudes of the two coherent beams, while the relative phase may be separately varied by tiltably adjusting the element 92.

If desired, the embodiment shown in FIGURE 8 may be modified by making element 92 a second absorbing plate having a transmittance characteristic curve similar to that shown in FIGURE 10, so that it will substantially block light wavelengths greater than $\lambda_0$, and transmit wavelengths less than $\lambda_0$, the transmittance characteristic curves of elements 90 and 92 crossing near the wavelength $\lambda_0$. With this modified embodiment, as the interference filter 94 is tiltably adjusted so that it transmits a wavelength $\lambda$ different from $\lambda_0$, it will be seen that the transmittance of element 90 is increased as the transmittance of element 92 is decreased, and vice versa. Thus, a wide range of variation in the amplitude ratio of the two beams passing through apertures 32*a* and 32*b* can be achieved with the modified embodiment shown in FIGURE 8.

The thickness of elements 90 and 92 are again selected so that the optical paths therethrough are equal at one adjusted angle of tilt of element 92, such as position 92*a* of FIGURE 8, and the tilting adjustment of element 92 thus serves to alter the relative phase of the two coherent beams, while the tilting adjustment of element 94 serves to alter the relative transmitted amplitudes of the two beams as explained above.

The filter 94 can be replaced by any monochromator, and in embodiments of the kind shown in FIGURE 8, unpolarized light is used throughout, and such elements as 34*a*, 34*b*, 36 and 38 (as shown in FIGURE 1) are omitted from such systems.

A brief consideration of the elementary or first-approximation theory of phase microscopy, as outlined in Phase Microscopy, Principles and Applications, by Bennett, Osterberg, et al. (John Wiley, 1951), will serve to demonstrate the usefulness of the present invention.

Figure 11A:
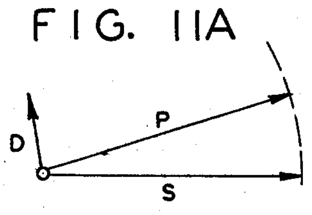
Figure 11C:
Figure 11B:
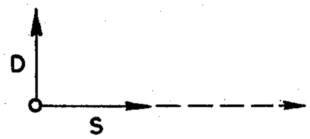
Figure 11D:

Referring first to FIGURE 11A, if a beam of light illuminates an object plane containing a particle having substantially the same absorption characteristics as its surround and only a slightly different index of refraction or optical path length, the light transmitted through a point in the particle (i.e. all of the light forming an image of that point in the image plane) may be represented in the phase diagram of FIGURE 11A by the vector P, which is of the same amplitude as and slightly out of phase with the vector S, which represents the light transmitted through a point in the surround. The vector P may also be regarded as the resultant of the vector S, representing the undeviated light from the point in the particle, and a shorter vector D, representing the deviated light from the point in the particle, approximately 90° out of phase with S. Thus, the light at the image plane consists of S throughout the image plane, and $S+D$ over the image of particle. But since $/S/=/S+D/$ (the length of vector S is equal to the length of vector P), the brightness of the surround and of the particle will be the same or substantially the same so that contrast will be poor. But if the vector D can be retarted in phase by an additional 90°, bringing it substantially opposite in phase to S, destructive interference occurs over the image of the particle, as indicated by FIGURE 11D, and the particle thereby appears darker than the surround. On the other hand, if the vector S can be retarded 90°, bringing it substantially into phase with D, as indicated in FIGURE 11C, the particle will appear brighter than the surround. These 90° phase retardations are customarily introduced by employing coatings on the conjugate area of the phase plate adapted to produce the desired amount of relative phase retardation between deviated and undeviated rays. See e.g., Bennett, Osterberg, et al., op. cit. pp. 25–28 and 75–93.

Since the apparent brightness varies with the square of the amplitude, the apparent contrast between the particle and its surround is enhanced if the amplitude of S is reduced, so that it is substantially equal to the amplitude of D, by employing an absorbing coating over the conjugate area of the phase plate. See Bennett, Osterberg, et al., op. cit. pp. 28–30. In FIGURE 11B, the undeviated light S has been partially absorbed to make its amplitude approximately equal to D. As shown in FIGURE 11C if S and D are then brought into phase, the resultant amplitude over the image of the particle, $S+D$, will be double the amplitude S over the image of the surround, and the particle will appear four times as bright as the surround. If S and D are made opposite in phase, as shown in FIGURE 11D, the resultant amplitude over the image of the particle will approach zero, and the particle will appear dark.

It will readily be seen from the above discussion that slight absorption by the particle will require the use of a phase plate having different coatings, and that an infinite number of phase plates would be needed to observe the infinite variety of specimens which might be encountered. A severe compromise with this requirement has been made in present commercial phase microscopes affording a choice between three or four different phase plates, but the present invention offers greatly increased flexibility of adjustments and a far wider range of contrasts in an economical optical system providing improved focusing characteristics and minimum halo effects.

Figure 12A:
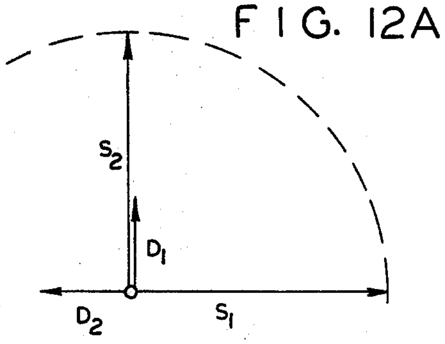

As shown in FIGURE 12A, the phase components of light present at the image plane in the embodiments of the present invention shown in FIGURES 1, 6, 7 and 8, may be regarded as including two coherent undeviated components, $S_1$ and $S_2$, present throughout the image plane, and their respective coherent deviated components $D_1$ and $D_2$, present only in the image of the diffracting particles.

The undeviated components $S_1$ and $S_2$ and the corresponding deviated components $D_1$ and $D_2$ are easily represented and determined in an acceptable manner when Kohler illumination is used. In particular, the undeviated components can be regarded as plane waves represented by constant vectors extending over the entire object plane. This simple constancy is lost when critical illumination is used, since light from each point in the source is focused upon the object plane not as a plane wave but as a diffraction image consisting of a central Airy disk together with its surrounding diffraction rings. Thus with critical illumination the undeviated waves are not constant but vary rapidly with distance across the object plane. Correspondingly, the deviated waves become more complex with critical illumination but, despite these complications, the concepts of undeviated and deviated beams can be applied when critical illumination is used to gain a qualitative explanation of the physical processes involved.

The phase differences between the two coherent illuminating beams and thus the phase difference between their undeviated component beams $S_1$ and $S_2$, may be varied by adjusting the phase retarding means 38 (FIGURES 1–6). For example, in FIGURE 12A, the undeviated beams are shown one-quarter wavelength or 90° out of phase; in FIGURE 12B, they are shown one-half wavelength or 180° out of phase; and in FIGURE 12C, they are in phase. By adjusting the variable phase retarding means 38, as described above, the phase of undeviated beam $S_1$ and its corresponding deviated beam $D_1$ may be varied with respect to the phase of undeviated beam $S_2$ and its corresponding deviated beam $D_2$.

Assuming that the particle has a slightly longer optical path than the surround and that the deviated components $D_1$ and $D_2$ are therefore retarded approximately 90° relative to their respective undeviated components $S_1$ and $S_2$, as shown in the phase diagram of FIGURE 12A, the adjustments which may be made to produce useful contrast effects are exemplified by the phase diagrams of FIGURES 12B, 12C, 12D and 12E.

Figure 12D:
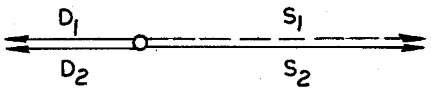
Figure 12B:
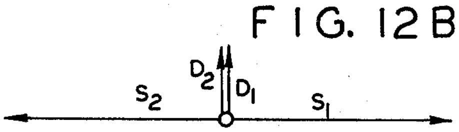

In FIGURE 12B, the undeviated components $S_1$ and $S_2$ have been brought 180° out of phase, producing destructive interference and a dark image of the surround, while the deviated components $D_1$ and $D_2$ have been brought into phase for constructive interference and a bright image of the particle. This could be accomplished, for example, by adjusting phase retarding means 38 (FIGURES 1–6) to produce zero relative retardation, and employing a phase plate 78 (FIGURE 1 and FIGURE 2) with conjugate areas designed to pass undeviated beam $S_1$ without retardation, while retarding undeviated beam $S_2$ by 180°.

Figure 12E:
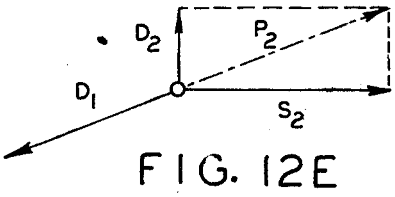
Figure 12C:
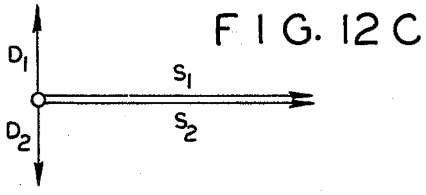

In FIGURE 12C, the undeviated components $S_1$ and $S_2$ have been brought into phase while the deviated components $D_1$ and $D_2$ have been brought 180° out of phase, producing an equally bright image of the surround and of the particle. This condition of expectedly poor contrast in the image can be accomplished by adjusting phase retarding means 38 (FIGURES 1–6) to produce a 180° relative phase retardation between the undeviated beams and employing a phase plate 78 having conjugate area coatings designed to pass undeviated beam $S_1$ without retardation, while retarding undeviated beam $S_2$ by a further 180°.

In the arrangement of FIGURE 12B, the amplitudes $S_1$ and $S_2$ of the two undeviated beams may be adjusted to be equal by rotating uniform polarizer 36 (FIGURES 1, 2 and 6), thereby producing optimum destructive interference in the dark area of the image.

A different arrangement for producing destructive interference and a dark image of the particle is shown in the phase diagram of FIGURE 12D, where the two deviated beams $D_1$ and $D_2$ are brought into phase with each other while one undeviated beam $S_2$ is brought 180° out of phase with $D_1$ and $D_2$, and the other undeviated beam $S_1$ is blocked. By adjusting the uniform polarizer 36 (shown in FIGURES 1, 2 and 6) to vary the relative amplitudes of the two undeviated beams, the sum of $D_1$ and $D_2$ can be made equal to $S_2$ for optimum destructive interference over the image of the particle, while maintaining optimum brightness of the surround. The necessary phase adjustments may be made by adjusting the phase retarding means 38 (shown in FIGURES 1–6) for zero relative retardation, and employing a phase plate (78 in FIGURES 1 and 2) having coatings on its complementary areas (68 in FIGURES 1 and 2) designed to retard the deviated components $D_1$ and $D_2$ by an additional 90° relative to undeviated component $S_2$, while having one conjugate area (such as 74 in FIGURES 1 and 2) covered with a fully absorbing coating to block completely undeviated component $S_1$ at the phase plate.

Figure 2:
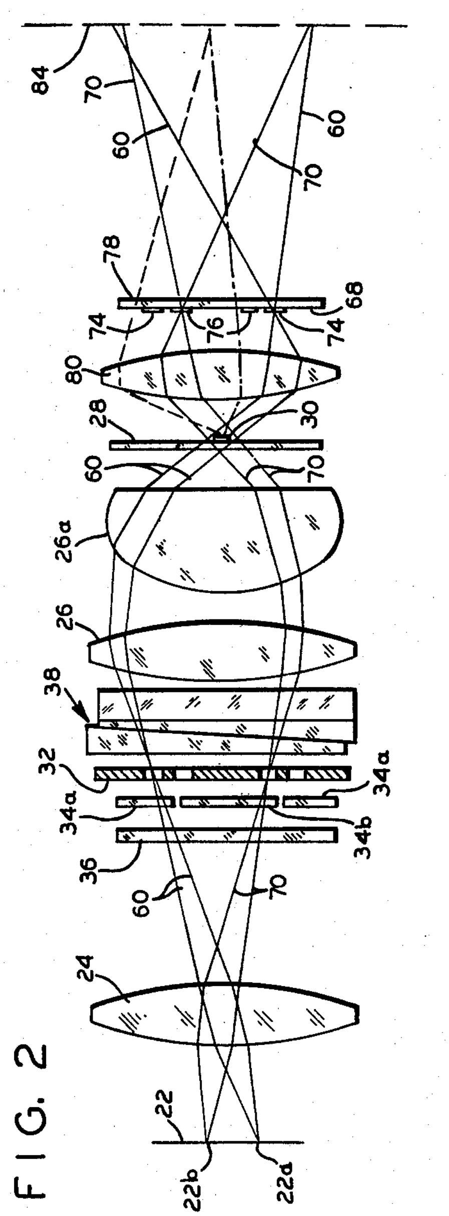
FIGURE 2 is a schematic diagram of the optical system of a variable phase microscope incorporating a modified embodiment of the invention and employing so-called "Kohler" illumination.

A second of the many ways of accomplishing the result of FIGURE 12D is to block the undeviated beam $S_1$ at the phase plate as in FIGURE 12D by means of an opaque coating, and then to produce the destructive interference over the image of the particle by adjusting element 38 and the polarizer 36 of FIGURES 1, 2, and 6 so that $D_1$ and $P_2$ $(=S_2+D_2)$ are equal and oppositely directed as in FIGURE 12E.

FIGURE 12B clearly shows how the present invention achieves a result beyond the capabilities of conventional phase microscopes. As explained above, a dark background can be produced by interfering the undeviated waves $S_1$ and $S_2$ destructively. The background is completely dark when the system is adjusted so that $|S_1|=|S_2|$ in FIGURE 12B.

To make the background completely dark in ordinary phase microscopy, one would have to make the conjugate area opaque and would be dealing with the extreme case known as schlieren microscopy—in some ways an unfavorable method of forming an image, in which the undeviated wave is blocked at the phase plate and not allowed to reach the image plane.

On the other hand, with the method of FIG. 12B, the undeviated waves $S_1$ and $S_2$ do reach the image plane and interfere there to produce the dark background without the use of schlieren phenomena. So, we have a distinctly new phase method for rendering the particle bright against a quite dark or dark background. The method of FIGURE 12B will produce bright contrast with less halo than in ordinary prior art phase microscopy.

These examples serve to demonstrate the useful combinations of interference effects which may be achieved with the systems of the present invention. By employing a plurality of undeviated coherent beams, a wider variety of constructive and destructive interference phenomena may be produced than is possible with prior phase microscopes, and the flexible adjustments made possible by tilting adjustment of the elements 92 and 94 shown in FIGURE 8, or by rotation of the variable uniform polarizer 36, adjustment of the phase retarding means 38 and selection of the phase plate 78, in cooperation with the phase compensator elements 86 and 88 and the other optical elements described above with reference to FIGURES 1–8, greatly enhance the usefulness and flexibility of the apparatus as compared with previously known phase microscopes.

The use of critical illumination permits the various beams to produce interference effects which could not be achieved with the Kohler illumination preferred in conventional phase microscopy apparatus without the use of a special coherent light source such as a laser. FIGURE 2, for example, shows an embodiment of the present invention adapted for use with Kohler illumination, each of the undeviated beams 60 and 70 being composed of rays not focused but substantially parallel at the specimen 30, these rays being focused by objective 80 at the conjugate areas 74 and 76 of phase plate 78. Beam 60 is produced by region 22*a* at the source, while beam 70 is produced by a different region 22*b*, and since light in these regions emanates from different points in the light source, the separate beams 60 and 70 will not be coherent, and interference effects between them cannot be achieved unless plane 22 is illuminated with coherent light. With incoherent Kohler illumination, uniform polarizer 36 may be rotated to cross its polarization plane with that of either zonal polarizer 34*a* or 34*b*, alternately blocking one of the undeviated beams 60 or 70. A choice of conjugate areas 74 and 76 is thereby made possible, in effect giving the user a choice of different phase plates without physically substituting one for another.

By employing the arrangements adapted for critical illumination, however, as shown above, the undeviated beams and the deviated components may all be made coherent, using conventional sources of illumination, and a variety of interference phenomena are made available, as indicated by the adjustments illustrated in the phase diagrams of FIGURES 12B, 12C, 12D and 12E.

When concentric annular apertures in condenser diaphragm 32 are employed, as described above, the undeviated beams 60 and 70 will be focused as cones of light rays with their apices at specimen 30, as shown in FIGURE 6. The two separately formed coincident images of source 22 thereby created at specimen 30 will each be a bright circular area with dark and bright rings around it. The diffraction image produced by outer cone 60 converging at the angle $\theta_1$ will be of similar diameter than the diffraction image produced by inner cone 70 converging at the smaller angle $\theta_2$. By changing the relative phase retardation of beams 60 and 70 and adjusting their amplitudes, as described above, the central part of one diffraction image may be brought into destructive interference with the central part of the other diffraction image. A greater part of the combined diffraction image can be made dark as cones 60 and 70 are made more similar by causing $\theta_1$ to approach $\theta_2$ and by making $\Delta\theta_1$ and $\Delta\theta_2$ approximately the same. If $\theta_1$ and $\theta_2$ could be made equal, the entire image of a light source of extended area could be darkened by the destructive interference of the two beams.

With the concentric annuli 32*a* and 32*b* described above, this phenomenon will permit the darkening of the image background for a source of appreciable area (controlled by the size of the opening at 22 in the iris diaphragm 21), as compared to a theoretical "point source" of light, merely by turning uniform polarizer 36 and adjusting phase retarding means 38. This adjustment of the amplitude ratio and phase difference between the illumination beams, in conjunction with the selection of $\theta_1$, $\theta_2$, $\Delta\theta_1$ and $\Delta\theta_2$, is also of assistance in controlling the amounts of halo effect produced for given degrees of contrast between the images of the particle and of the surround.

If the source of coherent illumination is to be a laser, this must be incorporated in the system with some care. It would not ordinarily do merely to set the end of the laser at 22 in FIGURE 1, for a small laser would emit a norrow pencil of light traveling down the optical axis, and would illuminate only the center of lens 24.

A laser of sufficient diameter is needed, as illustrated schematically in FIGURE 13.

In FIGURE 13, the laser 23 emits a collimated coherent beam, and collimating lens 24 is therefore omitted. This beam is directed through polarizing elements 36 and 34*a* or 34*b*, illuminating the transversely spaced apertures 32*a* and 32*b* with coherent light and thus producing two spaced coherent beams which are directed to converge substantially at a focal point *p'* in the object plane.

Because the light coming from the laser is a narrow collimated beam, a small patch about point P' will be illuminated. This somewhat thus restricts the field of view, but is acceptable and even desirable in specialized applications.

The source of illumination corresponding to the illuminated aperture 22 of FIGURE 1 would occur at $-\infty$ in FIGURE 13 (off the left-hand edge of the page). That is, in effect, the source is now a very small one quite far to the left of element 36.

Actually a divergent cone of rays does leave the laser, and one can arrange to increase this cone a bit by properly designing the laser.

FIGURE 14 shows what happens to the rays, very much as is shown in FIGURE 2.

In FIGURE 14, light issuing from each point P in the exit aperture of the laser 23 will diverge in a conical beam having an apex angle A. If the lens 24 has a magnifying effect, the points P will be refocused at the apertured diaphragm 32, converging through a smaller apex angle A'.

By selecting and arranging lens 24 to demagnify in imaging P into P', one can make A'>A instead of A'<A as in FIGURE 14. Thus one can choose lenses 24 and 26 to cooperate with the laser 23 in illuminating an increased useful field at specimen 30.

While the optical systems described above incorporate embodiments of the invention employing two concentric annular apertures in diaphragm 32, the principles of the invention may be advantageously applied in optical systems employing different numbers and shapes of diaphragm apertures, with corresponding changes in the number, shape, design and orientation of such other elements as the zonal polarizers, the phase retarding means and the conjugate areas of the diffraction plate.

The preferred form of the invention thus comprises a source of coherent illumination providing substantially plane wave fronts; apertured means for separating this illumination into spaced coherent beams; means for varying the relative vibrational character (polarization, phase and amplitude) of the spaced coherent beams; means for focusing the spaced coherent beams on an object plane preferably as critical illumination; an objective for forming an image of the object plane at an image plane and for forming an image of the apertured means; a phase plate located at the image of the apertured means; the phase plate having means for varying the relative vibrational character of the deviated and undeviated components of the spaced beams; and an analyzer for analyzing the changes in the vibrational character of the beams introduced by a specimen.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An optical system adapted for use in obtaining variable phase microscopic observation of transparent specimens, said system comprising a sub-stage section and a resolution section disposed in optical alignment with each other at opposite sides of an object plane of said system, said sub-stage section having a source of substantially coherent illumination, means for polarizing said illumination, light-condensing means disposed between said source and said object plane and arranged to direct said substantially coherent illumination along a predetermined path to said object plane, an opaque diaphragm in said path and having a pair of concentrically arranged spaced annular light-transmitting areas therein for providing a pair of substantially coherent light beams for illuminating an object at said object plane, a pair of polarizing elements disposed in said light beams respectively and differently oriented so as to polarize said light beams in two different substantially perpendicular planes relative to each other, and adjustable birefringent means disposed in said sub-stage section and aligned with said two substantially coherent polarized light beams for introducing a variable phase difference therebetween, said resolution section having an objective focused at said object plane and forming an image thereof at a conjugate image plane, and a phase plate disposed at a predetermined axial location between said objective and said image plane and of such size as to intercept substantially all of the deviated and undeviated components of the light rays from said object plane which pass through said objective, said phase plate having a pair of concentrically arranged spaced annular conjugate areas thereon, each conjugate area corresponding to a different one of said light-transmitting areas in said opaque diaphragm and each being of such size as to intercept substantially all of the undeviated components of the light beam from the corresponding light-transmitting area in said diaphragm which have passed through said objective, said phase plate also having complementary areas adjacent said conjugate areas and arranged to intercept most of the deviated components of said light beam which have passed through said objective, the total area of said complementary areas being materially greater than the total area of said conjugate areas, and the phase-retarding characteristics of said complementary areas being different from those of said conjugate areas.

2. The combination as set forth in claim 1 and including in the resolution section of said instrument polarizing means, at least one of said polarization means being rotatably adjustable, whereby the intensity of said perpendicularly polarized means at said image plane may be varied.

3. The combination defined in claim 1 including a quarter wave plate in the path of the deviated and undeviated components of said light beams after passing through said phase plate.

4. The combination as set forth in claim 1 and wherein said light-condensing means comprises a collimating lens and a condenser lens for providing a path of substantially parallel light therebetween and arranged to focus said source upon said object plane as substantially critical illumination, said opaque diaphragm, said pair of polarizing elements and said adjustable birefringent means being disposed in said substantially parallel beam.

5. The combination as set forth in claim 4 and including in the resolution section of said instrument polarizing means, at least one of said polarization means being rotatably adjustable, whereby the intensity of said perpendicularly polarized beams at said image plane may be varied.

6. The combination defined in claim 5 including a quarter wave plate in the path of the deviated and undeviated components of said light beams after passing through said phase plate.

7. An optical system adapted for use in obtaining variable phase microscopic observation of transparent specimens, said system comprising a sub-stage section and a resolution section disposed in optical alignment with each other at opposite sides of an object plane of said system, said sub-stage section having a source of substantially coherent illumination, light-condensing means disposed between said source and said object plane and including a collimating lens and a condensing lens arranged in spaced relation to each other and providing a path of substantially parallel light therebetween, and arranged to focus said substantially coherent illumination as substantially critical illumination at said object plane, an opaque diaphragm in said path and having a pair of concentrically arranged spaced annular light-transmitting areas therein for providing a pair of substantially coherent parallel light beams for illuminating an object at said object plane, a pair of light-modifying elements of different absorptive characteristics and each of such size and shape and so located as to be disposed respectively in said spaced parallel light beams, and at least one of said elements being tiltably adjustable relative to the other to vary the intensity of the light passing therethrough and a tiltable narrow band pass interference filter disposed in said sub-stage section so as to intercept both of said beams of parallel light, said resolution section having an objective focused at said object plane and forming an image thereof at a conjugate image plane, and a phase plate disposed at a predetermined axial location between said objective and said image plane and of such size as to intercept substantially all of the deviated and undeviated components of the light rays from said object plane which pass through said objective, said phase plate having a pair of concentrically arranged spaced annular conjugate areas thereon, each conjugate area corresponding to a different one of said light-transmitting areas in said opaque diaphragm and each being of such size as to intercept substantially all of the undeviated components of the light beam from the corresponding light-transmitting area in said diaphragm which have passed through said objective, said phase plate also having complementary areas adjacent said conjugate areas and arranged to intercept most of the deviated components of said light beam which have passed through said objective, the total area of said complementary areas being materially greater than the total area of said conjugate areas, and the phase-retarding characteristics of said complementary areas being different from those of said conjugate areas.

References Cited by the Examiner

UNITED STATES PATENTS

| | | | |
|---|---|---|---|
| 2,700,918 | 2/55 | Osterberg et al. | 88—39 |
| 2,924,142 | 2/60 | Nomarski | 88—39 |

FOREIGN PATENTS

| | | |
|---|---|---|
| 643,048 | 9/50 | Great Britain. |
| 647,191 | 12/50 | Great Britain. |
| 648,801 | 1/51 | Great Britain. |

DAVID H. RUBIN, *Primary Examiner.*